United States Patent
Debieuvre et al.

(10) Patent No.: US 9,976,867 B2
(45) Date of Patent: May 22, 2018

(54) NAVIGATION METHOD BASED ON A SEE-THROUGH HEAD-MOUNTED DEVICE

(71) Applicant: Essilor International (Compagnie Generale d'Optique), Charenton-le-Pont (FR)

(72) Inventors: Amandine Debieuvre, Charenton-le-Pont (FR); Benoît Callier, Charenton-le-Pont (FR); Marion Swital, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 55 days.

(21) Appl. No.: 14/915,863

(22) PCT Filed: Sep. 3, 2014

(86) PCT No.: PCT/EP2014/068763
§ 371 (c)(1),
(2) Date: Mar. 1, 2016

(87) PCT Pub. No.: WO2015/032833
PCT Pub. Date: Mar. 12, 2015

(65) Prior Publication Data
US 2016/0202081 A1  Jul. 14, 2016
US 2017/0160093 A9  Jun. 8, 2017

(30) Foreign Application Priority Data
Sep. 4, 2013 (EP) .................... 13306209

(51) Int. Cl.
*G01C 21/36* (2006.01)
*G02B 27/01* (2006.01)
*G01C 21/20* (2006.01)

(52) U.S. Cl.
CPC .......... *G01C 21/365* (2013.01); *G01C 21/20* (2013.01); *G02B 27/017* (2013.01);
(Continued)

(58) Field of Classification Search
CPC ... G06T 19/00; G06F 3/17; G06F 3/11; G02B 27/017
(Continued)

(56) References Cited

U.S. PATENT DOCUMENTS 8,814,691 B2 * 8/2014 Haddick ............. G02B 27/017
463/30
2010/0177179 A1  7/2010 Behm et al.
(Continued)

FOREIGN PATENT DOCUMENTS

DE  10 2008 042397 A1  4/2010
WO  2012114123 A1  8/2012

OTHER PUBLICATIONS

International Search Report and Written Opinion dated Dec. 5, 2014; International PCT Application No. PCT/EP2014/068783.

*Primary Examiner* — Thomas G Black
*Assistant Examiner* — Wae L Louie
(74) *Attorney, Agent, or Firm* — McGuire Woods LLP (57) ABSTRACT

A navigation method for a wearer of a see-through head mounted device, the method comprising: •—a wearer visualization parameter providing step (S1), during which at least one wearer visualization parameter is provided, •—a geo-position determining step (S2), during which the geo-position of the wearer along a route is determined, •—a geo-position comparing step during which the geo-position of the wearer determined during the geo-position determining step is compared to stored geo-positions along the route and •—a navigation visual aid function adapting step (S3) during which upon matching of the geo-position of the
(Continued)

wearer with one of the stored geo-positions, the navigation visual aid function is adapted based on the wearer vision parameter and the geo-position of the wearer to facilitate the guiding of the wearer.

18 Claims, 2 Drawing Sheets

(52) U.S. Cl.
CPC .... *G02B 27/0172* (2013.01); *G02B 2027/014* (2013.01); *G02B 2027/0138* (2013.01); *G02B 2027/0141* (2013.01); *G02B 2027/0178* (2013.01)

(58) Field of Classification Search
USPC ........ 701/523; 345/207, 419, 633, 8; 463/42

See application file for complete search history.

(56) References Cited

U.S. PATENT DOCUMENTS

| | | |
|---|---|---|
| 2010/0208045 A1 | 8/2010 | Willmann et al. |
| 2011/0221657 A1* | 9/2011 | Haddick .............. G02B 27/017 345/8 |
| 2012/0050144 A1 | 3/2012 | Morlock |
| 2012/0218301 A1* | 8/2012 | Miller .................. G02B 27/017 345/633 |
| 2014/0085282 A1* | 3/2014 | Luebke ................... G06F 3/147 345/207 |
| 2014/0128161 A1* | 5/2014 | Latta ....................... A63F 13/06 463/42 |
| 2014/0240313 A1* | 8/2014 | Varga .................... G06T 19/006 345/419 |
| 2014/0267403 A1* | 9/2014 | Maciocci .............. G06T 19/006 345/633 |
| 2015/0338653 A1* | 11/2015 | Subramaniam .... G02B 27/0172 345/8 |
| 2015/0370071 A1* | 12/2015 | Alton ................. G02B 27/0172 349/11 |
| 2016/0202081 A1* | 7/2016 | Debieuvre ............. G01C 21/20 701/523 |

* cited by examiner

NAVIGATION METHOD BASED ON A SEE-THROUGH HEAD-MOUNTED DEVICE

FIELD OF THE INVENTION

The invention relates to a navigation method for a wearer of a see-through head mounted device, to a computer program comprising instructions that when executed by a processor cause the processor to carry out the steps of the visual aid guidance navigation method of the invention and to a computer readable medium carrying the instructions of the computer program.

BACKGROUND OF THE INVENTION

Navigation devices based for example on GPS technology are known. Such devices provide visual information, typically on a display screen and usually audio information.

The information provided to the user is based on the position of the wearer and a "go to" point specified by the user. The device calculates a route based on stored maps and user parameters and provides guidance navigation to the user.

Such devices are not adapted to users having low vision or more generally users having an ophthalmic deficiency.

The travels of users having an ophthalmic deficiency using such devices are difficult, routes errors are increased and the travel times are extended.

Thus, it is desirable to provide a visual aid guidance navigation method that is adapted to users having an ophthalmic deficiency, in particular users with visual impairment.

In order to improve wearer visual comfort, it is desirable to provide a visual aid guidance navigation method wherein images and text are displayed in a customized way that is specifically adapted to the wearer.

Furthermore, it is desirable to provide a visual aid guidance navigation method that optimizes the user navigation and streamlines the travels of the users having an ophthalmic deficiency.

SUMMARY OF THE INVENTION

A goal of the present invention is to provide such a method.

The present invention generally provides methods and systems for visual aid guidance navigation with a head-mounted device, wherein customization of the navigation is achieved by taking into account wearer-specific visualization parameters. Such visualization parameters include parameters pertaining to the wearer ophthalmic data such as wearer prescription data.

According to the invention, the quality of the wearer visual experience and of the navigation can be enhanced by taking into account wearer-specific visualization parameters.

To this end, the invention proposes a navigation method for a wearer of a see-through head mounted device, the method comprising:
- a wearer visualization parameter providing step, during which at least one wearer visualization parameter is provided,
- a geo-position determining step, during which the geo-position of the wearer along a route is determined,
- a geo-position comparing step during which the geo-position of the wearer determined during the geo-position determining step is compared to stored geo-positions along the route and
- a navigation visual aid function adapting step during which upon matching of the geo-position of the wearer with one of the stored geo-positions, the navigation visual aid function is adapted based on both the wearer vision parameter and the geo-position of the wearer, in particular to facilitate the guiding of the wearer, wherein the navigation visual aid is provided by the see-through head mounted device.

Advantageously, by adapting the navigation visual aid function of the head mounted device along a route based on the wearer vision parameter and the geo-position of the wearer, the method of the invention provides a visual guidance navigation method adapted to the wearer's ophthalmic deficiency.

The wearer travels are enhanced and facilitated.

Furthermore, the method of the invention allows offering to the wearer a customized recognition function of a route adapted to his ophthalmic deficiency, which facilitates traveling for the wearer. In addition, pre-recording custom routes adapted to the ophthalmic deficiency of each wearer allows optimizing the processing and display by the head mounted device along a route, which can provide selective and qualitative information to assist wearer with strong ophthalmic deficiency along a route.

According to further embodiments which can be considered alone or in any possible combination:
the head mounted device comprises a display device and the navigation visual aid function adapting step further comprises:
- a processed image selection step, during which upon matching of the geo-position of the wearer with one of the stored geo-positions, at least one of processed image associated with the stored geo-position matching the geo-position of the wearer is selected according to the wearer visualization parameter,
- a display step during which the processed image of the visual environment of the wearer is displayed to the wearer by the see-through head mounted display device; and/or the head mounted device comprises a display device and a camera adapted to acquire images of the visual environment of the wearer, and the navigation visual aid function adapting step further comprises:
- an image acquisition step, during which at least one image of the visual environment of the wearer is acquired by the camera,
- an image processing selection step during which upon matching of the geo-position of the wearer with one of the stored geo-positions, at least one of the image processing associated with the stored geo-position matching the geo-position of the wearer is selected according to the wearer visualization parameter,
- an image processing step during which the image of the visual environment acquired during the image acquisition step is processed according to the image processing selected during image processing selection step,
- a display step during which the processed image of the visual environment is displayed to the wearer by the see-through head mounted display device; and/or the navigation visual aid function adapting step further comprises:
- an image element identifying step during which the image of the visual environment of the wearer is analyzed so as to identify at least one predefined element listed in a predefined elements list, each of the predefined elements being associated with at least one image processing, and during the image processing selection step upon identification of an element of the image of the visual environment of the wearer corresponding to one of the predefined elements listed in the predefined elements list, an image processing associated with the predefined element identified in the image of the visual environment of the wearer is selected; and/or the method further comprises:

a visual environment parameter determining step during which at least one visual environment parameter is determined, and during the image processing selection step the image processing is selected according to the visual environment parameter and/or during the processed image selection step, the processed image is selected according to the visual environment parameter; and/or the method further comprises:

a sending step during which the geo-position is sent to a distant entity to be compared to stored geo-positions associated with at least one image processing, a receiving step during which the selected image processing is received from a distant entity; and/or the method further comprises:

a sending step during which the geo-position to a distant entity to be compared to stored geo-positions associated with at least one image processing, and the acquired image of the visual environment of the wearer is sent to the distant entity to be processed based on the image processing associated to the geo-position, a receiving step during which the processed image is received from a distant entity; and/or the distant entity is a smartphone and/or a smart-watch; and/or the method further comprises displaying complementary visual information based over the processed image of the visual environment based on the geo-position of the wearer; and/or the head mounted display device comprises an active function and a control unit configured to control the active function, and the active function is adapted during the navigation visual aid function adapting step; and/or the method further comprises providing audio indications to the wearer based on the geo-position of the wearer; and/or the method further comprises a step of pre-registering, in a database, an association between a wearer identifier and said wearer visualization parameters; and/or at least one of said wearer visualization parameter is stored in a wearer database on a server connected to the head mounted device via a network, in association with the wearer identifier; and/or the method further comprises a preliminary step of pre-registering, in a database, at least a route comprises the following sub steps:

an association step during which a geo-position along the route determined during the geo-position determining step is associated with at least one navigation visual aid function modification, and a storing step during which the geo-position and the associated at least one navigation visual aid function modification are stored; and/or the preliminary step further comprises:

an image acquisition step, during which at least one image of the visual environment of the wearer is acquired by the camera, and an image processing selection step during which at least one of image processing is selected according to the wearer visualization parameter, an image processing step during which the image of the visual environment acquired during the image acquisition step is processed according to the image processing selected during image processing selection step, and during the association step the processed image is associated with the geo-position; and/or the navigation visual aid function modification data are defined according to said wearer identifier, optionally in accordance with access rights; and/or the association step is carried out by the wearer; and/or the method further comprises prior to the geo-position comparing step a receiving step during which the stored geo-positions associated with the navigation visual aid function modification are received and stored from a distant entity; and/or the preliminary step further comprises:

an image selection step, during which at least one image is selected, and an image processing selection step during which at least one of image processing is selected according to the wearer visualization parameter, an image processing step during which the selected image is processed according to the image processing selected during image processing selection step, and during the association the processed image is associated with the geo-position.

The invention further relates to a head mounted see-through electro-optical device comprising a control unit configured to control the navigation visual aid function of the device and a processor adapted to implement a method according to the invention.

According to a further aspect, the invention relates to a computer program product comprising one or more stored sequences of instructions that are accessible to a processor and which, when executed by the processor, causes the processor to carry out the steps of the method according to the invention.

The invention further relates to a computer readable medium carrying one or more sequences of instructions of the computer program product according to the invention.

Furthermore, the invention relates to a program which makes a computer execute the method of the invention.

The invention also relates to a computer-readable storage medium having a program recorded thereon; where the program makes the computer execute the method of the invention.

The invention further relates to a device comprising a processor adapted to store one or more sequence of instructions and to carry out at least one of the steps of the method according to the invention.

BRIEF DESCRIPTION OF THE DRAWINGS

Non limiting embodiments of the invention will now be described with reference to the accompanying drawings in which.

DEFINITIONS

The following definitions are provided to describe the present invention.

"Server" SERV are known in the art. A server SERV may be connected via an extended network NETW to a plurality of terminals TERM. The network NETW allows for data transmission and may rely on wireless communication such as radio frequency communication (Wi-Fi, Bluetooth, 3G, 4G, etc.) and/or optical communication (Li-Fi, IR, near IR, visible, etc.) and/or wire-communication (Ethernet, optical fiber). The server SERV may comprise one or more databases DB and/or it may be connected to one or more databases DB.

According to an embodiment of the invention, hereafter "local" implementation, all of the steps of the invention are carried out locally by at least one processor located in the head mounted device. For such implementation of the invention, the head mounted device is to comprise at least a memory and a processor.

According to an embodiment of the invention, hereafter "remote" implementation, at least parts of the steps of the invention are carried out by at least one remote processor. The remote processor may be located in a distant server SERV linked to the head mounted device via a network.

Figure 2:
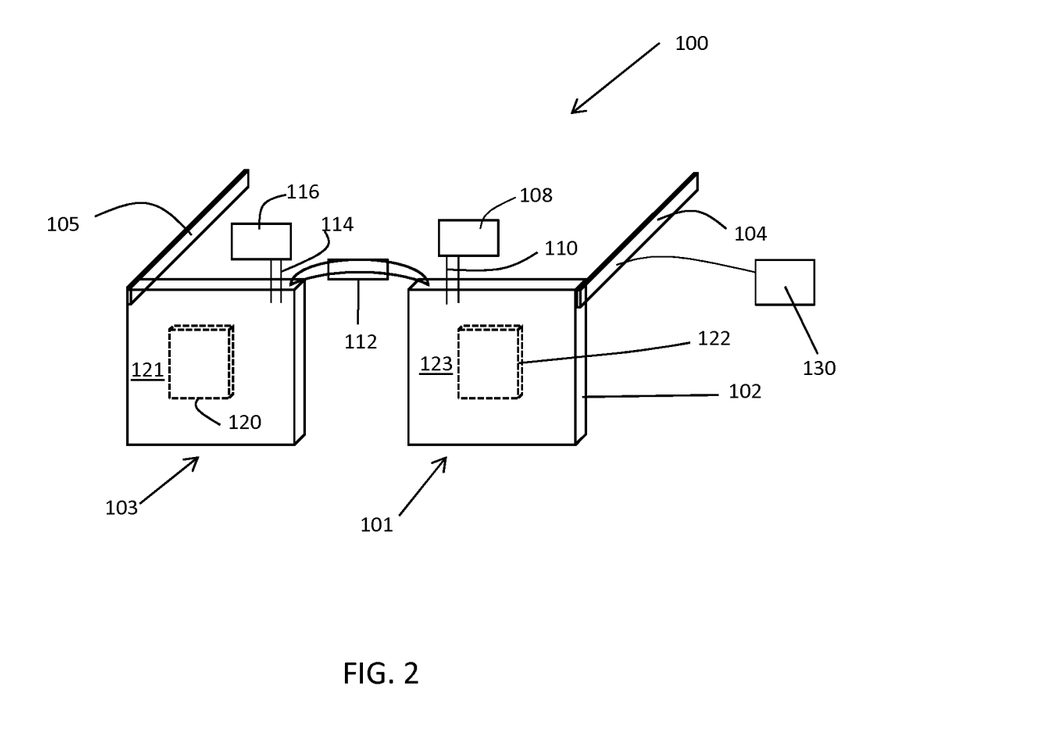
FIG. 2 represents a head mounted electro-optical device that may implement a method according to an embodiment of the invention.

"Head-mounted devices" (HMD) are known in the art. Such devices are to be worn on or about the head of a wearer. They include optical means for displaying an image for visualization by the wearer. The HMD may be monocular (single eye) or binocular (both eyes). The HMD of the invention can take various forms, including eyeglasses, masks such as skiing or diving masks, goggles, etc. The HMD may comprise one or more lenses. Said lenses can be selected from prescription lenses. In preferred embodiments, the HMD is a pair of eyeglasses provided with lenses. An example of head mounted device of the invention is illustrated at FIG. 2.

"Visualization parameter data" (VPD) include one or more of wearer ophthalmic data OD (such as prescription data PD, eye sensitivity data SD, and biometry data BD) and/or wearer eye data (ED). Said VPD may be stored on a memory built in on the HMD, and/or be stored on a dedicated database DB accessible via a server SERV.

"Wearer ophthalmic data" or "ophthalmic data" OD are known in the art. Wearer ophthalmic data include wearer prescription data PD, wearer eye sensitivity data SD and wearer ophthalmic biometry data BD.

"Prescription data" PD are known in the art. Prescription data refers to one or more data obtained for the wearer and indicating for each eye a prescribed far vision mean refractive power PFV, and/or a prescribed astigmatism value CYLFV and/or a prescribed astigmatism axis AXEFV and/or a prescribed addition A suitable for correcting the ametropia and/or presbyopia of each eye. The mean refractive power PFV is obtained by summing the half value of the prescribed astigmatism value CYLFV to the prescribed sphere value SPHFV: PFV=SPHFV+CYLFV/2. Then, the mean refractive power for each eye for proximate (near) vision is obtained by summing the prescribed addition A to the far vision mean refractive power PFV prescribed for the same eye: PNV=PFV+A. In the case of a prescription for progressive lenses, prescription data comprise wearer data indicating for each eye values for SPHFV, CYLFV and A. In preferred embodiments, wearer prescription data PD are selected from astigmatism module, astigmatism axis, power, prism and addition.

"Wearer eye sensitivity data" SD are known in the art. Wearer eye sensitivity data include data for spectral sensitivity (to one or more wavelengths or spectral bands); general sensitivity such as brightness sensitivity, for example for outdoors brightness sensitivity, the colors of the wearer's eyes, the light and/or glare sensitivity or recovery of the wearer. Such data are of importance to optimize contrast for visualization of an image by the wearer.

"Wearer ophthalmic biometry data" or "biometry data" BD are known in the art. Biometry data include data pertaining to the morphology of the wearer, and typically include one or more of monocular pupillary distance, inter-pupillary distance, axial length of the eye, position of the center of rotation of the eye, etc.

"Wearer eye data" are known in the art. Eye data include parameters that are not directly related to an ophthalmic parameter depending on the desired settings of the head mounted device such as the dark adaptation of the user, color vision of the user, visual field, binocular vision, saccadic eye movements of the wearer, fixation stability, the visuomanual coordination of the wearer, the "head/eye" movement coordination of the wearer, the gazing direction of both eyes of the wearer at a given distance vision and so forth, pupil dilation, eyelid position. It may also comprise visual diseases and/or characteristic of visual scotoma.

"Wearer database" WEAR DB is a database comprising a memory suitable for storing and retrieving wearer visualization parameter data VPD. Databases and memories are known in the art. The retrieval of visualization parameter data can be achieved through the use of dedicated pointers, such as visualization parameter identifiers VP ID. For example, identifiers WEAR ID can serve as visualization parameter identifiers VP ID. Each wearer identifier WEAR ID 1, 2, . . . n, allows the retrieval of various prescription data PD, here illustrated as power P, astigmatism ASTI, addition ADD, etc., for each of the right eye RE and the left eye LE of the wearer.

DETAILED DESCRIPTION OF THE INVENTION

Figure 1:
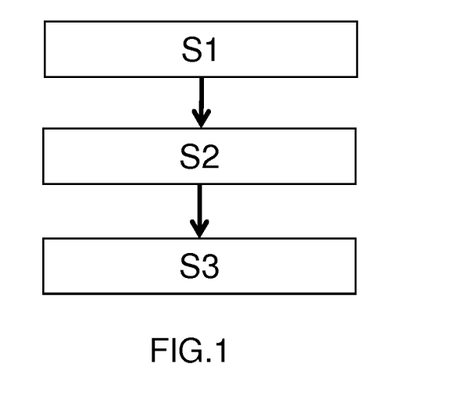
FIG. 1 is flowchart representing the steps of a method according to an embodiment of the invention.

According to an embodiment of the invention illustrated on FIG. 1, the visual aid guidance navigation method for a wearer of a see-through head mounted device, comprises:
 a wearer visualization parameter providing step S1,
 a geo-position determining step S2,
 a geo-position comparing step, and
 a see-through head mounted device function adapting step S3.

The method of the invention may be implemented by computer means.

During the wearer visualization parameter providing step S1, the value of at least one wearer visualization parameter data VPD relating to the visual profile of the wearer is provided.

In the sense of the invention, the visual profile of the wearer is to be understood as a set of parameters related to the wearer. The visual profile comprises parameters defining the vision of the wearer in a static and dynamic matter.

The visual profile includes wearer visualization parameter data VPD and may comprises wearer eye data ED and/or ophthalmic data OD including wearer prescription data PD, wearer eye sensitivity data SD and/or wearer ophthalmic biometry data BD.

The wearer vision parameter providing step S1 can be a step of transmitting said VPD data. For example, the transmission may be to a controller on the head mounted device. The transmission may be by wireless communication or by input through a flash-drive (USB key). The wearer vision parameter providing step S1 may also be performed by manually providing a setup on the head mounted device, for example by turning a thumb wheel on the head mounted device for adjusting vision parameters to obtain the desired focus or to change the location of the image within the vision filed of the wearer.

According to an embodiment of the invention, the method may comprise a wearer vizualisation parameter determining step S0, during which the values of the VPD data comprised in the visual profile of the wearer are determined.

VPD data may be determined and/or updated by any means known by the skilled person, for example using speed sensors or by exchanging data with a remote entity via a network.

The values of the wearer parameters may be determined by downloading the wearer's visual profile from a distant entity. Typically, a distant entity may store data relating to the wearer. Among such data, some data may be identified as part of the wearer's visual profile.

Visual tests may be carried out either to determine the visual profile of the wearer or in addition to the downloaded values of the wearer's visual profile so as to complete or adjust the visual profile of the wearer.

For example, the wearer may be asked to gaze at near distance target and the gazing directions of both eyes of the wearer may be determined. Such gazing directions may be used to determine the viewing distance of the wearer.

According to an embodiment, the wearer visualization parameter determining step S0 is performed by interactive series of tests to assess visual performance and evaluation on subjective preferences of the wearer.

For example, acuity test visualization letter, test font test, test space characters, test reading acuity, test display mode, a glare test or an eye movement test can be implemented.

VPD data can be defined by measuring the wearer's behavior and the real-word scene during some activities such as reading, watching any kind of media, etc In another aspect of the invention, the visualization parameter data VPD of step S1 may be stored in a memory stored in a wearer database WEAR DB on a server SERV connected to said head mounted device HMD via a network NETW, in association with a visualization parameter identifier VP ID. This embodiment is advantageous in that it allows updates of the visualization parameter data VPD. For example, for a given wearer, prescription data may evolve over time and/or the wearer may change device HMD. The use of a server in the method of the invention provides for update features to faithfully customize image displays by the device HMD.

The visualization parameter identifier VP ID can be an individual one, for example, a unique identifier that identifies a given wearer. The visualization parameter identifier VP ID may also be a generic identifier (group identifier), for example to identify a group of wearer having identical prescription data PD, for example wearers having the same myopia correction, or a group of wearer having the same model of device HMD.

The visualization parameter identifier VP ID may be a code, such as a QR code or an RFID code, located on the HMD.

During the geo-position determining step S2, the geo-position of the wearer is determined.

The determination of the geo-position of the wearer may be implemented using a GPS system or equivalent.

According to an embodiment of the invention, the geo-position of the wearer may comprise in addition or instead of the GPS system an image recognition system. The image recognition system comprises at least a camera adapted to acquire images of the visual scene around the wearer and processing means adapted for image recognition.

For example the image recognition system may be adapted to recognize a list of given places such a list of particular buildings in a city.

The image recognition system may also be adapted to recognize a list of recurrent objects that the wearer may come across, such as street lights, crosswalk, road signs, etc. . . .

During the geo-position comparing step, the geo-position of the wearer determined during the geo-position determining step is compared to stored geo-positions along the route.

During the navigation visual aid function adapting step S3, a navigation visual aid function of the head mounted device is adapted based on the wearer visualization parameters data VPD and the geo-position of the wearer upon matching of the geo-position of the wearer with one of the stored geo-positions along a route to make easier the guiding of the wearer.

In the sense of the invention, a navigation visual aid function relates to any adaptation or modification of the HMD useful to make easier the guiding of the wearer by enhancing the wearer visual experience of a used route.

As described herewith below in various embodiments, the navigation visual aid function adaptation may be a control of an active function of the HMD and/or a switch between different predetermined head mounted device functions and/or any functions related to images of real scene and/or computer-generated images.

According to an embodiment of the invention, upon detection of a given geo-position of the wearer navigation visual aid function of the head mounted device is adapted according to the wearer vision parameter.

For example, upon detection of the fact that the wearer is facing a street light, using the GPS localization and an image recognition system, the function of the head mounted device is adapted so as to visually emphasize the street light for the wearer.

According to an embodiment of the invention, the method may comprise a suggestion step during which an adapted head mounted device function is suggested to the user. According to such embodiment, the adapted head mounted device function of the head-mounted device is adapted upon validation from the user of the suggested adapted head mounted device function.

According to an embodiment, the head mounted device function may be switched between different predetermined head mounted device functions.

According to an embodiment of the invention, the head mounted device may comprise an active function and a control unit configured to control the active function.

The active function is adapted during the navigation visual aid function adapting step.

In an embodiment, the active function is of the electro chromic type.

The amount of light being transmitted by the electro chromic device can be controlled, for example by controlling the intensity of an electrical field or electrical tension across the electro chromic device of the HMD.

The transmission of the electro chromic device may be adapted to during the visual aid function adapting step.

For example, based on the light sensitivity of the wearer two level of light transmission may be determined. Based on the geo-position of the wearer, the electro chromic device may be controlled to switch between the two levels of light transmission. Typically, upon detection that the wearer is entering a building or a tunnel the light transmission may be set of a high level whereas upon detection that the wearer is exiting a building or a tunnel, the light transmission may be set to a lower level.

Therefore, the user can move along a route serenely, in a safe way.

The geo-position of the wearer may be combined with further information for determining the most appropriate function of the head mounted device.

According to an embodiment of the invention, the method may further comprise a visual environment parameter providing step prior to the navigation visual aid function adapting step S3.

During the visual environment parameter providing step, the value of at least one parameter related to the environment of the wearer is provided.

For example the hour of the day, or the time of the year may be considered. Direct environment data may also be considered. For example, the head-mounted device may comprise a light sensor adapted to measure the luminosity of the environment.

The function of the head mounted device, typically the light transmission, may be adapted considering said further information.

Such environment parameters may also correspond to the visage detection, the collision risk detection, the head mounted device status, such as the battery level, notifications, displayed contents, or any other parameter related to the environment of the wearer.

According to an embodiment of the invention, transmission, reflexion and/or absorption specifications of a filter are adapted during the navigation visual aid function step.

According to an embodiment of the invention, the head mounted device may comprise a programmable lens whose dioptric function may be controlled by controlling the tension across the lens.

The dioptric function of the programmable lens may be adapted so as to emphasize an element of the visual environment of the wearer. Typically, upon detection that the wearer is facing a street light, the dioptric function of the programmable lens may be adapted so as to provide a clear vision of the street light to the wearer.

According to an embodiment of the invention, the head mounted device is a head mounted display device a represented on FIG. 2.

In this example, the frame is similar to a conventional eyeglasses frame and can be worn with a similar comfort level. However, other implementations are possible, such as a face shield which is mounted to the user's head by a helmet, strap or other means. The frame includes a frame front 102 and temples 104 and 105. The frame front holds a see-through lens 101 for the user's left eye and a see-through lens 103 for the user's right eye. The left and right orientations are from the user's perspective. The left-side see-through lens 101 includes a light-transmissive optical component 122 such as a beam splitter which mixes an augmented reality image with light from the real-world scene for viewing by the left eye.

The right-side see-through lens 103 includes an optical component 120 such as a beam splitter which mixes an augmented reality image with light from the real-world scene for viewing by the right eye.

A right-side augmented reality emitter 116 is mounted to the frame via an arm 114, and a left-side augmented reality emitter 108 is mounted to the frame via an arm 110.

The head mounted device comprises a scene camera 112 adapted to acquire images for the real-world scene facing the wearer.

An electrical power source 130, for example a battery provides power to the different elements of the head mounted device.

Appropriate electrical connections can be made via conductive paths in the frame, for instance.

Figure 3:
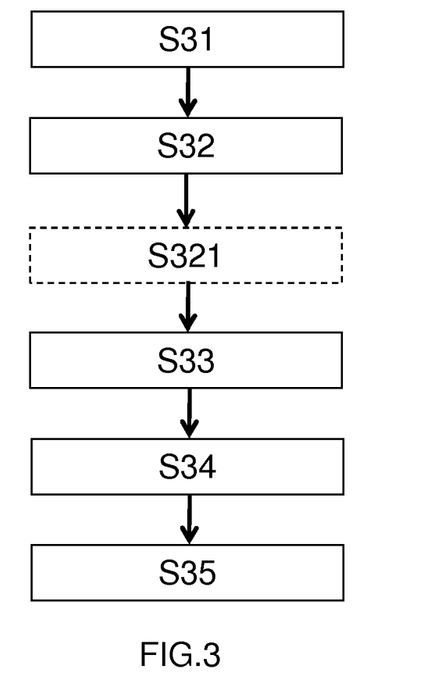
FIG. 3 is a flowchart representing the sub-steps of the see-through head mounted device function adapting step according to a local implementation of the invention.

An example of local implementation of the invention using a head mounted device as represented on FIG. 2 is illustrated on FIG. 3.

According to such embodiment, the navigation visual aid function adapting step may further comprise:

an image acquisition step S31,
an image processing selection step S33,
an image processing step S34, and
a display step S35, At least one image of the real-world scene facing the wearer is acquired by the scene camera during the image acquisition step S31.

According to the local implementation of the invention, the image acquired by the scene camera is stored in a memory comprised in the head mounted remove device.

During the geo-position comparing step, the geo-position of the wearer determined during the geo-position determining step, for example using the GPS coordinates determined by a GPS chip located in the head mounted device, is compared to stored geo-positions along a route.

The stored geo-positions are stored in association with at a least one image processing in a memory. The geo-positions and the associated image processing may be listed as a data base stored locally in a memory included in the head mounted device.

According to an embodiment of the invention, the method may further comprise an image element identifying step S321.

During the image element identifying step S321, the image acquired during the image acquisition step S31 is analyzed so as to identify at least one predefined element listed in a predefined elements list. Each of the predefined elements of the predefined elements list is associated with at least one image processing.

The analysis of the image may consist in identifying elements in the image using an appropriate algorithm and upon identification of elements comparing the identified element with pre-stored elements.

Advantageously, the image element identifying step allows providing a more specific and adapted image processing based on the identified elements. The image element identifying step may also be used to provide the geo-position of the wearer or at least to increase the accuracy of the geo-position of the wearer.

During the image processing selection step S33, at least one of the image processing associated with the stored geo-position matching the geo-position of the wearer is selected.

Image processing can be selected in the list consisting of:
magnification of the image, and/or
remapping of the image, and/or
minimisation of colors, and/or
magnification of colors, and/or
remapping of colors, and/or
image intensity enhancement, and/or
contrast enhancement, and/or
brightness enhancement, and/or
brightness adjustment field of view, and/or
minification of the image, and/or
contour enhancement, and/or
binarization of the image.

Image processing may also include the position (location) of the display of the image in the vision field of the wearer (for example with reference to the frame of the device HMD) and/or the location of the focus plan of the image to be visualized.

For example, the image processing is selected upon matching of the geo-position determined during the geo-position determining step and one of the stored geo-positions.

Typically, the database may comprise a stored geo-position corresponding to road works. The geo-position may be associated with different image processing that, based on the wearer's ophthalmic deficiency, may emphasis the indication of the road works.

For example, the database may comprise a stored geo-position corresponding to risk zone alerts.

For example, to enhance street name signs the image processing may be an image magnification combined with a contrast enhancement.

To enhance train station signs, the image processing may be an image magnification combined with a brightness enhancement.

To enhance information displayed on a digital screen, the image processing may be an image magnification combined with an image binarization.

For example, for a given myopic wearer with given prescription data PD, an image displayed according to the invention would be customized to the wearer's ametropia/presbyopia and perfectly sharp for said wearer, but would not be sharp for another wearer having different prescription data.

To enhance information displayed on a wall, for example a map of a metro line, the processor of the HMD performs a calculation step or a processing step so as to provide modified image data which are adapted to the wearer VPD.

Advantageously, the method according to the invention provides reliable security means to move along a route serenely in a easy and safe way.

A plurality of image processing may be associated to a geo-position. The selection of the most appropriate image processing or combination of image processing is based at least on the wearer vision parameter.

According to the embodiment of the invention comprising the image element identifying step, the selection of the most appropriate image processing may further be based on the element identified in the image.

Advantageously, the relevancy of the image processing is greatly increase by identifying elements to be enhanced in the acquired image.

The selection of the most appropriate image processing may further be based on environment parameters, determined during the visual environment parameter determining step. Among the environment parameters that may be of interest one may consider the time of the day (day/night), the hour of the day and/or the weather as already mentioned.

Indeed, depending on the environment parameters the image processing to be applied may be deferent and even the type of information to be enhanced may change.

Typically, certain road signal may require to be enhanced in rainy weather whereas in dry conditions said road sign is of no interest and therefore should not be enhanced by the method of the invention, for example slippery road signs.

The environment parameters may be determined by any means known by the skilled person, for example using sensors or by exchanging data with a remote entity via a network. The environment parameters may also be provided by the wearer using communication means provided with the head mounted device.

The selection of the most appropriate image processing may further be based on wearer activity parameters, determined during a wearer activity parameters determining step. Among the wearer activity parameters that may be of interest one may consider the activity of walking, driving, bicycling etc. . . .

Indeed, depending on the wearer's activity the image processing to be applied may be deferent and even the type of information to be enhanced may change.

Typically, when the wearer is walking the pedestrian lights are of a particular interest whereas when the wearer is driving the road lights are of particular interest.

During the image processing step S34, the image of the visual environment of the wearer acquired during the image acquisition step S31 is processed according to the selected image processing.

The step S34 may comprise a single (one shot) calculation, or may comprise 'dynamic', continuous or real-time calculations, for example for dynamic visualization of an image. According to the local implementation of the invention, the image is processed using a processor located in the head mounted device.

The processed image of the visual environment of the wearer is displayed to the wearer during the display step. The processed image is displayed using the see-trough head mounted display device.

Figure 4:
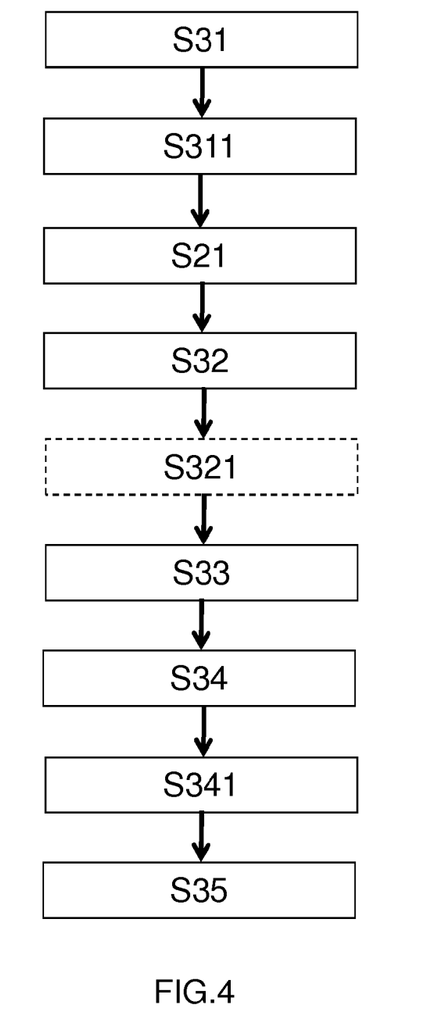
FIG. 4 is a flowchart representing the sub-steps of the see-through head mounted device function adapting step according to a remote implementation of the invention.

A remote implementation of the invention is illustrated on FIG. 4.

According to such embodiment, the navigation visual aid function adapting step comprises:
an image acquisition step S31,
an acquired image sending step S311,
an image processing selection step S33,
an image processing step S34,
a receiving step S341, and
a display step S35.

The image acquisition step S31 is equivalent to the one described in detail for the local implementation of the invention.

During the acquired image sending step S311, the acquired image acquired during the image acquisition step S31 is sent from the head mounted device to a distant entity, for example a distant server.

The geo-position acquired during the geo-position determining step is sent to a distant entity during the geo-position sending step S21.

The geo-position comparing step S32 is equivalent to the one described in detail for the local implementation of the invention apart that said step is implemented at a distant server side. The stored geo-positions associated with image processing are stored, for example as a data base, in a memory of the distant server.

The method may further comprise an image element identifying step S321 as for the local implementation. The image element identifying step S321 is carried out by a processor located at the distant server side.

The image processing selection step S33 and the image processing step S34, are equivalent to the ones described in detail for the local implementation of the invention apart that said steps are implemented at the distant server side.

During the receiving step S341, the processed image is received by the head mounted display device.

As for the local implemented embodiment, the received processed image is displayed to the wearer during the display step S35.

The present invention also provides for a method for retrieving suitable data for the display of processed images. The data may be tied to a specific location, so as to 'tag' or 'flag' information, pictures and the like, to that specific location. The location need not be of fixed GPS coordinates.

In this embodiment, receiving step may be a step of transmitting said processed image data from a communication terminal TERM to the head mounted device HMD. The transmission may be 'push' or 'pull' from the wearer point of view, namely either irrespective of any command from the wearer, or triggered by an active command of the wearer.

According to this embodiment, the processed image may be stored on a memory on said terminal TERM, or be stored in a database DB connected to the terminal TERM via a network NETW. The database DB may comprise sets of data, wherein each set of data correspond to a given content (text, image, etc.).

According to an alternative remote embodiment the processing of the acquired image may be implemented locally by a processor located in the head mounted device.

Advantageously, according to such embodiment the need in bandwidth is reduced since the images are not transmitted between the head mounted device and the distant server.

According to another embodiment, the image acquisition step of the real scene may be replaced by an image retrieving step during which a stored image in a database or memory is retrieved to be processed after the image processing selection step.

The processing step and the image processing selection step may be removed if the stored image is already preprocessed before storing.

Therefore, the stored geo-positions are stored in association with at a least one image and image processing in a memory and/or with at least a pre processed image.

The image can be a computer-generated image or an image of a real scene previously acquired by the wearer or download.

Said data can be stored in a memory of the HMD and/or in a database accessible via a server.

So as to provide real time information to the wearer, the steps of the method of the invention are preferably repeated at a frequency of at least 15 Hz, preferably at least 20 Hz, most preferably at least 24 Hz.

In addition to the processed image, the method may comprise displaying complementary visual information in addition to the processed image of the visual environment of the wearer based on the geo-position of the wearer.

Typically, the method may display traffic information, shopping information, orientation information or any other type of information relevant for the wearer.

According to an embodiment of the invention, the method may further comprise providing audio indications to the wearer based on the geo-position determined during the geo-position determining step.

According to an embodiment, the present invention also provides a method for creating processed image (tag/content). Said processed image may then subsequently be retrieved and displayed. The processed image may also be associated with a given location, so that the invention also provides a method for tagging with a processed image.

In this embodiment, the method may comprise optional (i) a step of detecting a movement of a wearer provided with a head-mounted processed image displaying device HMD, and (ii) as a function of the recognition of the movement of step (i), a step of acquiring data. The movement of step (i) can be any movement suitable for generating a control signal for command.

The step (ii) of acquiring data may comprise one or more selected from selecting an option from a menu, hitting at least one key on a virtual keyboard, hand-writing on a virtual note pad, giving instructions by vocal command, taking a digital picture or recording a digital video. The data of step (ii) may thus be data for text, pictures, combinations thereof, etc. The invention may thus provide for virtual posts, which are computer-generated processed image tags with content. The step (ii) may also be a step of virtually annotating, for example by virtual clicking (selection from a pre-defined menu or predefined icons, such as selection of a virtual button 'Like!') or virtual hand-writing, which may be recognized and converted into digital text.

Again, the communication terminal may or may not be connected to a server via a network. In the method of the invention, step (ii) may be performed without connection to a server. Alternatively said at least one communication terminal TERM may be connected to a communication server SERV via a network NETW and the processed image can be stored in a communication database DB in association with a location. The association of the transmitted data with a given location allows the option of pinning a tag, namely of associating a processed image (content) with a specific location. For example, customer reviews of a restaurant may be made available on a terminal situated in the vicinity of said restaurant. The location associated with the data may or may not be the location of the wearer: the location may be that of the wearer when the wearer is present in the vicinity of the terminal, but it is also possible for the wearer to provide the association between the data and the location at a time when the wearer is no longer at the location of interest, for example by providing the data to the server via a network using another terminal.

The present invention also provides options for defining wearer profiles and access rights. The definition of wearer profiles is useful to provide selected information of relevance for a given wearer. For example, if the wearer is interested sports, specific contents in relation to sports may be made available for said wearer for visualization. Access rights may be defined for the retrieval of processed image data (restricted access for visualizing a tag or content) and/or for the creation of a processed image (restricted access for generating a tag or content).

According to an embodiment of the invention, the method may further comprise prior to the navigation visual aid function adapting step S3 a preliminary step of pre-registering, in a database, at least a route comprises the following sub steps:
an association step, and
a storing step.

During the association step, way points of a route are associated with at least one navigation visual aid function modification and wearer visualization parameters data and/or visualization parameter identifier.

More particularly, during the association step, different geo-positions of the wearer are selected, determined and associated with at least one navigation visual aid function modification, for example an image processing.

The geo-position of the wearer may be determined as indicated previously, by any means known of the skilled person such as using a GPS chip.

The navigation visual aid function modification may be selected based on predetermined rules or selected by the wearer based on his preference or a combination of both. For example a list of see-trough head mounted device function modifications can be proposed to the wearer and the wearer selects the most appropriate modification.

The association of navigation visual aid function modification and waypoints of a route can be customized by the wearer and/or download from a distant entity.

The distant entity may provide generic wearer profile to download wherein association between waypoints along a route customized visual aid function modification and visualization parameter identifier are proposed.

Furthermore, the customization may be shared with a group of other wearers. For example wearers having the same type of ophthalmic deficiency may share the association of image processing and geo-positions along a route.

The association step can be carried out locally. The geo-position and associated see-trough head mounted device function modification are stored in a memory located in the head mounted device.

The association step can be carried out remotely. The geo-position and associated see-trough head mounted device function modification are sent to and stored in a distant entity, for example a server.

Typically, a wearer may navigate around a city and upon identification of a specific location decide to associate the location with a see-trough head mounted device function modification, such as image processing. Therefore, when passing by said specific location again, the see-trough head mounted device shall adapt the see-trough head mounted device function based on the selected modification.

According to an embodiment of the invention, the see-trough head mounted device function modification, such as image processing, selected by the wearer is automatically associated with the geo-position and memorized.

Therefore, when the wearer passes at the same location upon a further trip, the see-trough head mounted device function modification previously selected may be either automatically applied or at least proposed to the wearer.

The see-trough head mounted device function modification may further be associated with visual environment parameters. Therefore, upon identification of similar environment parameters the see-trough head mounted device function modification selected by the wearer may be proposed to the wearer.

During the storing step, the geo-position and the associated at least one navigation visual aid function modification are stored in a database DB with the wearer visual profile.

In one embodiment, image data are stored in an image database on a server or locally.

Furthermore, it is possible to define access rights to certain images. Accordingly, where image data are stored in an image database, the method of the invention may comprise a preliminary step of pre-registering, in said database, an association between a wearer identifier and said wearer, and image data, optionally in accordance with access rights. The wearer identifier may be the same or different than the visualization parameter identifier VP ID. The wearer identifier may a code, for example a QR code or an RFID code, located on the device HMD or the server. It is thus possible to define one or more levels of access rights in connection with the image database.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A navigation method for a wearer of a see-through head mounted device, the method comprising:
    a wearer visualization parameter providing step, during which at least one wearer visualization parameter relating to an eye condition of the wearer is received;
    a geo-position determining step, during which the geo-position of the wearer along a route is determined;
    a geo-position comparing step, during which the geo-position of the wearer determined during the geo-position determining step is compared to stored geo-positions along the route; and
    a navigation visual aid function adapting step, during which upon matching of the geo-position of the wearer with one of the stored geo-positions, the navigation visual aid function is adapted based on both the wearer visualization parameter and the geo-position of the wearer, wherein the navigation visual aid is provided by the see-through head mounted device.

2. The navigation method according to claim 1, wherein the head mounted device comprises a display device and the navigation visual aid function adapting step further comprises:
    a processed image selection step, during which upon matching of the geo-position of the wearer with one of the stored geo-positions, at least one of processed image associated with the stored geo-position matching the geo-position of the wearer is selected according to the wearer visualization parameter; and
    a display step during which the processed image of the visual environment of the wearer is displayed to the wearer by the see-through head mounted display device.

3. The navigation method according to claim 1, wherein the head mounted device comprises a display device and a camera adapted to acquire images of the visual environment of the wearer, and the navigation visual aid function adapting step further comprises:
    an image acquisition step, during which at least one image of the visual environment of the wearer is acquired by the camera;
    an image processing selection step, during which upon matching of the geo-position of the wearer with one of the stored geo-positions, at least one of the image processing associated with the stored geo-position matching the geo-position of the wearer is selected according to the wearer visualization parameter;

an image processing step, during which the image of the visual environment acquired during the image acquisition step is processed according to the image processing selected during image processing selection step; and a display step, during which the processed image of the visual environment is displayed to the wearer by the see-through head mounted display device.

4. The navigation method according to claim 3, wherein the navigation visual aid function adapting step further comprises:

an image element identifying step, during which the image of the visual environment of the wearer is analyzed so as to identify at least one predefined element listed in a predefined elements list, each of the predefined elements being associated with at least one image processing; and during the image processing selection step, upon identification of an element of the image of the visual environment of the wearer corresponding to one of the predefined elements listed in the predefined elements list, an image processing associated with the predefined element identified in the image of the visual environment of the wearer is selected.

5. The navigation method according to claim 3, wherein the method further comprises:

a visual environment parameter determining step during which at least one visual environment parameter is determined; and during the image processing selection step the image processing is selected according to the visual environment parameter and/or during the processed image selection step, the processed image is selected according to the visual environment parameter.

6. The navigation method according to claim 3, wherein the method further comprises:

a sending step during which the geo-position is sent to a distant entity to be compared to stored geo-positions associated with at least one image processing; and a receiving step during which the selected image processing and/or the processed image is received from a distant entity.

7. The navigation method according to claim 3, wherein the method further comprises:

a sending step, during which the geo-position to a distant entity to be compared to stored geo-positions associated with at least one image processing, and the acquired image of the visual environment of the wearer is sent to the distant entity to be processed based on the image processing associated to the geo-position; and a receiving step, during which the processed image is received from a distant entity.

8. The navigation method according to claim 3, wherein the method further comprises displaying complementary visual information based over the processed image of the visual environment based on the geo-position of the wearer.

9. The navigation method according to claim 3, wherein the head mounted display device comprises an active function and a control unit configured to control the active function, and the active function is adapted during the navigation visual aid function adapting step.

10. The navigation method according to claim 3, wherein the method further comprises a step of pre-registering, in a database, an association between a wearer identifier and said wearer visualization parameters.

11. The navigation method according to claim 10, wherein at least one of said wearer visualization parameter is stored in a wearer database on a server connected to the head mounted device via a network, in association with the wearer identifier.

12. The navigation method according to claim 10, wherein the navigation visual aid function modification data are defined according to said wearer identifier, optionally in accordance with access rights.

13. The navigation method according to claim 3, wherein the method further comprises a preliminary step of pre-registering, in a database, at least a route comprises the following sub steps:

an association step during which a geo-position along the route determined during the geo-position determining step is associated with at least one navigation visual aid function modification, and a storing step during which the geo-position and the associated at least one navigation visual aid function modification are stored.

14. The navigation method according to claim 13, wherein the preliminary step further comprises:

an image acquisition step, during which at least one image of the visual environment of the wearer is acquired by the camera;

an image processing selection step during which at least one of image processing is selected according to the wearer visualization parameter;

an image processing step during which the image of the visual environment acquired during the image acquisition step is processed according to the image processing selected during image processing selection step; and during the association step the processed image is associated with the geo-position.

15. The navigation method according to claim 13, wherein the preliminary step further comprises:

an image selection step, during which at least one image is selected; and an image processing selection step during which at least one of image processing is selected according to the wearer visualization parameter;

an image processing step during which the selected image is processed according to the image processing selected during image processing selection step; and during the association step the processed image is associated with the geo-position.

16. The navigation method according to claim 13, wherein the association step is carried out by the wearer.

17. The navigation method according to claim 1, wherein the method further comprises prior to the geo-position comparing step, performing a receiving step, during which the stored geo-positions associated with the navigation visual aid function modification are received and stored from a distant entity.

18. A computer program product comprising one or more stored sequences of instructions that are accessible to a processor and which, when executed by the processor, causes the processor to carry out instructions comprising:

a wearer visualization parameter providing step, during which at least one wearer visualization parameter relating to an eye condition of the wearer is received;

a geo-position determining step, during which the geo-position of the wearer along a route is determined;

a geo-position comparing step, during which the geo-position of the wearer determined during the geo-position determining step is compared to stored geo-positions along the route; and a navigation visual aid function adapting step, during which upon matching of the geo-position of the wearer with one of the stored geo-positions, the navigation visual aid function is adapted based on both the wearer visualization parameter and the geo-position of the wearer, wherein the navigation visual aid is provided by the see-through head mounted device.

\* \* \* \* \*